United States Patent
Serban

(10) Patent No.: US 7,633,434 B2
(45) Date of Patent: *Dec. 15, 2009

(54) PULSE RADAR SYSTEM WITH A SIGNAL INTEGRATION DEVICE HAVING A SAMPLE AND HOLD CIRCUIT

(75) Inventor: Gabriel Serban, North York (CA)

(73) Assignee: Siemens Milltronics Process Instruments, Inc., Peterborough, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/283,927

(22) Filed: Sep. 16, 2008

(65) Prior Publication Data

US 2009/0085799 A1    Apr. 2, 2009

(30) Foreign Application Priority Data

Sep. 28, 2007    (EP)    ................................ 07019146

(51) Int. Cl.
*G01S 7/292*    (2006.01)
*G01S 13/00*    (2006.01)

(52) U.S. Cl. ...................................................... 342/124
(58) Field of Classification Search .................. 342/124, 342/205, 195

See application file for complete search history.

(56) References Cited

U.S. PATENT DOCUMENTS

| 4,071,844 A | * | 1/1978 | Hopwood et al. ............ 342/199 |
| 4,132,991 A | | 1/1979 | Wocher et al. |
| 4,521,778 A | | 6/1985 | Knepper |
| 6,060,915 A | | 5/2000 | McEwan |
| 6,087,978 A | | 7/2000 | Lalla et al. |
| 2006/0187111 A1 | | 8/2006 | Uchino |

FOREIGN PATENT DOCUMENTS

WO    WO 0214899 A1    2/2002

* cited by examiner

*Primary Examiner*—Dan Pihulic

(57) ABSTRACT

In a pulse radar system where received echo pulses are expanded in time by multiplication with sampling pulses and subsequent integration, the effect of disturbances on the integration is reduced by using a sample and hold circuit having a switch and a hold capacitor and wherein the switch is closed only when a sampling pulse is applied for the multiplication.

2 Claims, 1 Drawing Sheet

PULSE RADAR SYSTEM WITH A SIGNAL INTEGRATION DEVICE HAVING A SAMPLE AND HOLD CIRCUIT

CROSS REFERENCE TO RELATED APPLICATIONS

This application claims priority of European Patent Office application No. 07019146.5 EP filed Sep. 28, 2007, which is incorporated by reference herein in its entirety.

FIELD OF INVENTION

The present invention relates to a pulse radar system.

BACKGROUND OF INVENTION

Such a pulse radar systems are known from U.S. Pat. Nos. 4,521,778 and 4,132,991.

SUMMARY OF INVENTION

A pulse radar system has a transmit clock generator for generating a transmit clock at a transmit clock frequency, a transmit pulse generator triggered by the transmit clock for generating transmit pulses at the transmit clock frequency and for conveying the transmit pulses to be transmitted via an antenna to a target, a sampling clock generator for generating a sampling clock at a sampling clock frequency slightly different from the transmit clock frequency, a sampling pulse generator triggered by the sampling clock for generating sampling pulses at the sampling clock frequency, a signal mixer for generating an intermediate frequency signal by mixing echo pulses reflected from the target with the sampling pulses, and signal integration means for integrating the intermediate frequency signal.

Pulse radar systems provide distance or level measurement based on the direct measurement of the running time of microwave pulses transmitted to and reflected from a target, e. g. the surface of a fill material in a container. As the running time for distances of a few meters is in the nanosecond range, a special time transformation procedure is required to enable these short time periods to be measured. The microwave pulses are transmitted to the target at a repetition rate or transmit clock frequency which is given by a transmit clock generator. In a signal mixer, the received echo pulses reflected from the target are sampled by cross-correlation with sampling pulses of the same shape as the transmit pulses but at a sampling clock frequency slightly lower than the transmit clock frequency. The cross-correlation and subsequent integration or low-pass filtering leads to an intermediate frequency (IF) signal corresponding to the received echo pulses but time-expanded relative thereto by a factor $T1/(T1-T2)$, where $T1$ is the transmit pulse repetition period and $T2$ is the sampling period. The time-expansion allows for amplifying, digitizing and further processing of the echo pulses with standard techniques.

The use of RC integration or low-pass filtering means has a few drawbacks:

Due to the continuous integration, the signal-to-noise ratio of the IF signal is deteriorated.

In the interval time between IF pulses, some of the electric charge stored in the integrating capacitor is lost due to conduction of the mixer diodes.

The 1/f noise produced by the mixer diodes will be applied through the RC integration or low-pass filtering means to the IF amplifier.

In an ideal signal mixer, the IF signal is zero when one or both input signals are zero. However, due to unbalances and mismatches in the signal mixer, small signal portions will appear at the output of the mixer. For example, transmit pulses leaking through a directional coupler to the signal mixer will produce IF pulses that act as noise at the output of the mixer which will be then integrated and amplified.

It is therefore an object of the invention to overcome these drawbacks.

The object is achieved by the pulse radar system of the type initially mentioned in that the signal integration means comprises a sample and hold circuit having a switch and a hold capacitor and in that the switch is arranged to sample the intermediate frequency signal at the sampling clock frequency. The switch may be controlled directly by the sampling clock. However, to allow optimal timing, the signal integration means may further comprise a control pulse generator for generating switch control pulses to control the switch at the sampling clock frequency and with an adjustable time delay to the sampling pulses.

The switch is closed only when a sampling pulse is applied to the signal mixer. The hold capacitor is then charged to the peak value of the output signal of the mixer. Shortly thereafter the switch is opened and the capacitor will hold that value until the next sampling pulse is applied to the mixer. Thus, the integrating hold capacitor and the following amplifier are decoupled from the signal mixer during the time intervals between the sampling pulses so that any disturbances appearing in that time intervals at the mixer output are prevented from reaching the amplifier and further signal processing.

BRIEF DESCRIPTION OF THE DRAWINGS

The invention will be now described by way of a preferred example and with reference to the accompanying drawing, in which.

DETAILED DESCRIPTION OF INVENTION

Figure 1:
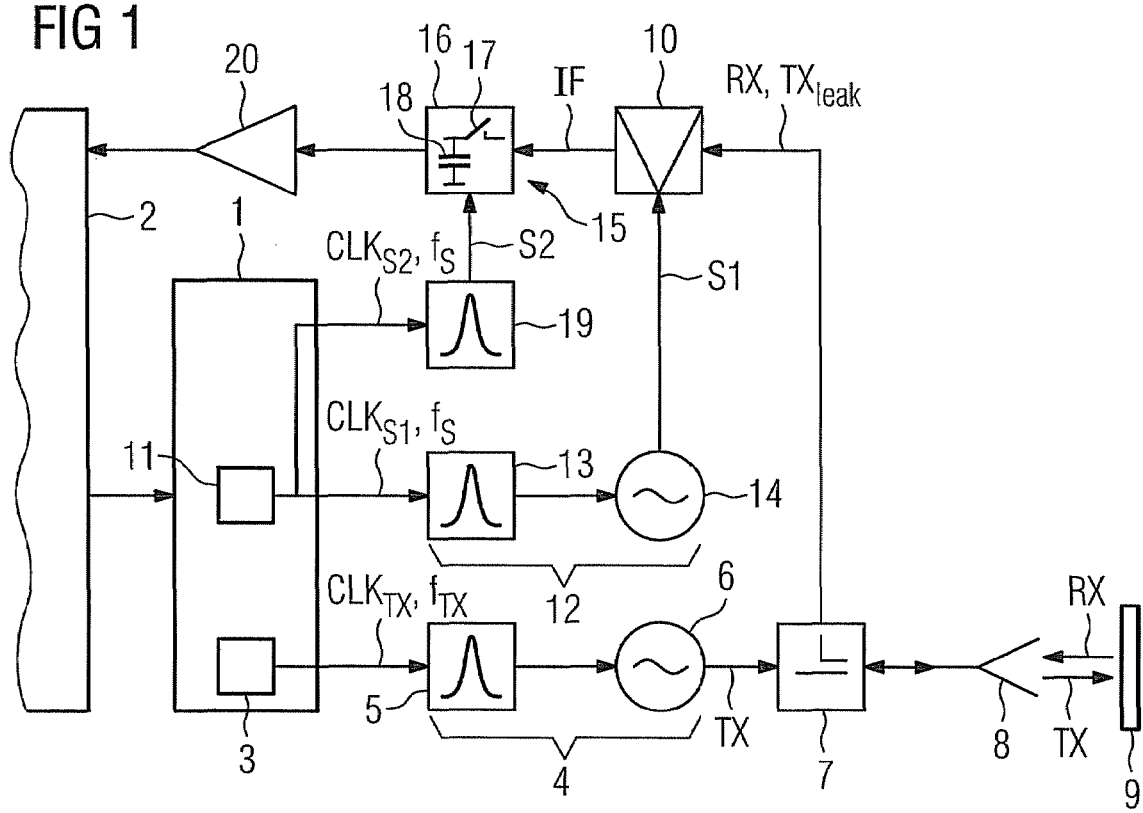
FIG. 1 shows a block diagram of a pulse radar system according to the invention having.

Reference is first made to FIG. 1 which exemplarily shows the basic components of a pulse radar system according to the invention. A time base control circuit 1, which is under control of a microcontroller 2, contains a transmit clock generator 3 for generating a transmit clock $CLK_{TX}$ at a transmit clock frequency $f_{TX}$ in the MHz range. The transmit clock $CLK_{TX}$ triggers a transmit pulse generator 4 comprising a pulse shaper 5 and a transmit oscillator 6 for generating microwave transmit pulses TX with a pulse repetition rate equal to the transmit clock frequency $f_{TX}$. The transmit pulses TX may have a duration of 1 ns and a frequency in the GHz range. The transmit pulses TX are transmitted through a directional coupler (hybrid) 7 and an antenna 8 to a target 9, e. g. the surface of a fill material in a container. The target 9 reflects the transmit pulses TX back as echo pulses RX which are received by either the same antenna 8 or a separate antenna (not shown). The received echo pulses RX are passed through the directional coupler 7 to a signal mixer 10. The time base control circuit 1 further contains a sampling clock generator 11 for generating a sampling clock $CLK_{S1}$ at a sampling clock frequency $f_S$ which is slightly lower (for instance by a few kHz) than the transmit clock frequency $f_{TX}$. The sampling clock $CLK_{S1}$ triggers a sampling pulse generator 12 comprising a pulse shaper 13 and a local oscillator 14 for generating sampling pulses S1 of the same shape as the transmit pulses TX and with a pulse repetition rate equal to the sampling clock frequency $f_S$. The signal mixer 10 generates an intermediate frequency signal IF by multiplying the received echo pulses RX by the sampling pulses S1. The intermediate frequency signal IF is applied to signal integration means 15 which comprises a sample and hold circuit 16 having a switch 17 and a hold capacitor 18. The switch 17 is controlled by switch control pulses S2 from a control pulse generator 19 at the sampling clock frequency $f_S$ and with an adjustable time delay to the sampling pulses S1. Thus, the switch 17 is closed only when a sampling pulse S1 is applied to the signal mixer 10. The hold capacitor 18 is then charged to the peak value of the intermediate frequency signal IF. Shortly thereafter the switch 17 is opened and the capacitor 18 will hold that value until the next sampling pulse S1 is applied to the signal mixer 10. The output signal of the signal integration means 15 is then amplified in an amplifier 20 and further processed in the microcontroller 2 for determining the running time of the transmit pulses TX to the target 9.

Figure 2:
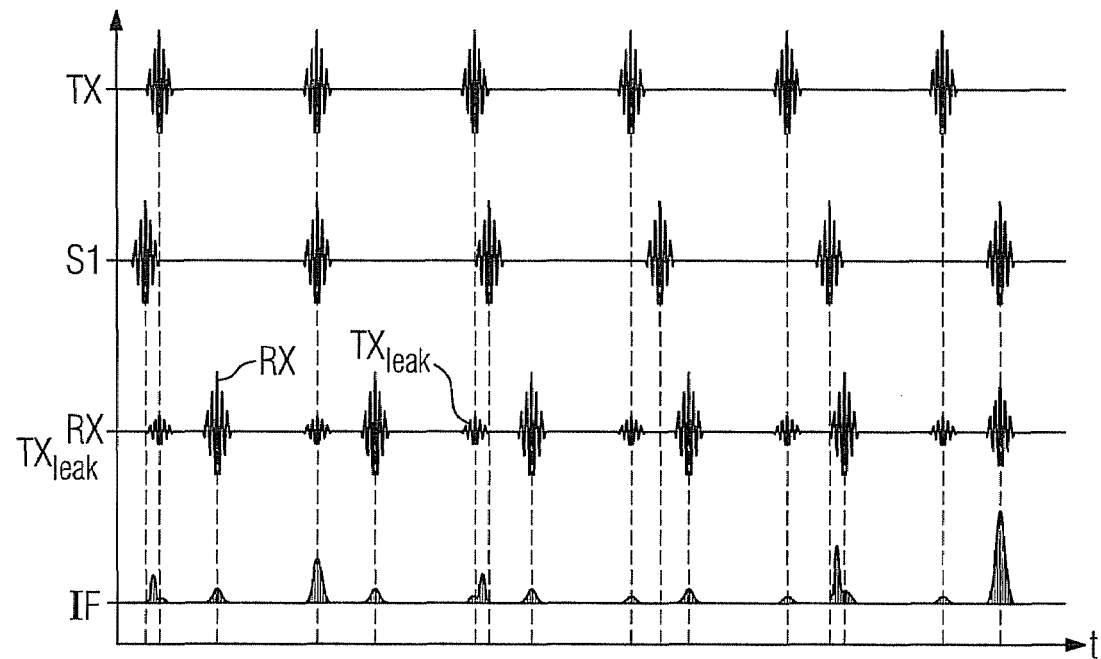
FIG. 2 is a timing diagram showing of pulse sequences in the pulse radar system.

FIG. 2 shows from top to bottom sequences of the transmit pulses TX, sampling pulses S1, received echo pulses RX and the intermediate frequency signal IF at the output of the signal mixer 10. As the pulse repetition rate of the sampling pulses S1 is slightly lower than that of the transmit pulses TX, the sampling pulses S1 will sweep in small increments per measuring cycle over the pulse interval. In the signal mixer 10, the received echo pulses RX as well as disturbing signal portions such as transmit pulses $TX_{leak}$ leaking through a directional coupler 7 to the mixer 10 are multiplied with the sampling pulses S1 so that the received echo pulses RX and other signal portions appearing at the input of the mixer 10 are sampled by cross-correlation with the sampling pulses S1. The cross-correlation and subsequent integration by the signal integration means 15 leads to a signal which is expanded in time and in shape corresponds to the received echo pulses RX and other signal portions.

As can be seen from FIG. 2, unbalances and mismatches in the signal mixer 10 may cause small signal portions to appear in the output signal IF of the mixer 10 even if no sampling pulses are present. Thanks to the sample and hold circuit 16, the hold capacitor 18 and the following amplifier 20 are decoupled from the signal mixer 10 during the time intervals between the sampling pulses S1 so that any disturbances appearing in that time intervals at the output of the mixer 10 are prevented from being integrated and reaching the amplifier and further signal processing.

The invention claimed is:

1. A pulse radar system comprising:
    a transmit clock generator for generating a transmit clock at a transmit clock frequency;
    a transmit pulse generator triggered by the transmit clock for generating transmit pulses at the transmit clock frequency and for conveying the transmit pulses to be transmitted via an antenna to a target;
    a sampling clock generator for generating a sampling clock at a sampling clock frequency different from the transmit clock frequency;
    a sampling pulse generator triggered by the sampling clock for generating sampling pulses at the sampling clock frequency;
    a signal mixer for generating an intermediate frequency signal by mixing echo pulses reflected from the target with the sampling pulses; and
    a signal integration device for integrating the intermediate frequency signal, wherein
    the signal integration device comprises a sample and hold circuit having a switch and a hold capacitor, the switch being arranged to sample the intermediate frequency signal at the sampling clock frequency, and wherein
    the signal integration device further comprises a control pulse generator for generating switch control pulses to control the switch at the sampling clock frequency and with an adjustable time delay to the sampling pulses.

2. The pulse radar system according to claim 1, wherein the generated sampling clock frequency is slightly different from the transmit clock frequency.

* * * * *